(12) United States Patent
Martini

(10) Patent No.: US 12,647,409 B2
(45) Date of Patent: *\*Jun. 2, 2026**

(54) COMPUTER SECURITY SYSTEM WITH REMOTE BROWSER ISOLATION USING FORWARD PROXYING

(71) Applicant: iboss, Inc., Boston, MA (US)

(72) Inventor: Paul Michael Martini, Boston, MA (US)

(73) Assignee: iboss, Inc., Boston, MA (US)

( * ) Notice: Subject to any disclaimer, the term of this patent is extended or adjusted under 35 U.S.C. 154(b) by 8 days.

This patent is subject to a terminal disclaimer.

(21) Appl. No.: 18/614,894

(22) Filed: Mar. 25, 2024

(65) Prior Publication Data

US 2024/0422151 A1 Dec. 19, 2024

Related U.S. Application Data

(63) Continuation of application No. 18/139,192, filed on Apr. 25, 2023, now Pat. No. 11,943,216, which is a
(Continued)

(51) Int. Cl.
*H04L 29/06* (2006.01)
*H04L 9/40* (2022.01)
(52) U.S. Cl.
CPC ........ *H04L 63/083* (2013.01); *H04L 63/0281* (2013.01); *H04L 63/0815* (2013.01)
(58) Field of Classification Search
CPC ............... H04L 63/083; H04L 63/0281; H04L 63/0815; H04L 63/08; H04L 63/10; H04L 63/102; H04L 63/168
See application file for complete search history.

(56) References Cited

U.S. PATENT DOCUMENTS

| | | | | | |
|---|---|---|---|---|---|
| 12,309,134 | B2 * | 5/2025 | Mehra | ................. | H04L 63/0892 |
| 2008/0301460 | A1 * | 12/2008 | Miller | ................. | H04L 63/0815 |
| | | | | | 713/183 |

(Continued)

OTHER PUBLICATIONS

M. Jung, G. Kienesberger, W. Granzer, M. Unger and W. Kastner, "Privacy enabled web service access control using SAML and XACML for home automation gateways," 2011 International Conference for Internet Technology and Secured Transactions, Abu Dhabi, United Arab Emirates, 2011, pp. 584-591. (Year: 2011).*

(Continued)

*Primary Examiner* — Ka Shan Choy
(74) *Attorney, Agent, or Firm* — Fish & Richardson P.C.

(57) ABSTRACT

A client device is configured to receive user-input and provide user-output to a client-user. A service provider is configured to serve a network-provided service for authorized users. An identity provider is configured to: maintain authorization information for the network-provided service and generate a permission-object that i) specifies that the client-user is an authorized user of the network-provided service and ii) may include an access-override field that specifies a network address of a remote browser isolation (RBI) host. The system also includes the RBI host configured to access the network-provided service; run the network-provided service in an isolation environment to generate a graphic user interface (GUI); provide a visual reproduction of the GUI to the client device; receive browser-input from the client device; and apply the browser-input to the running network-provided service.

14 Claims, 7 Drawing Sheets

Related U.S. Application Data continuation of application No. 17/861,107, filed on Jul. 8, 2022, now Pat. No. 11,683,305.

(56)                References Cited

U.S. PATENT DOCUMENTS

| | | | | |
|---|---|---|---|---|
| 2014/0245389 A1* | 8/2014 | Oberheide | .......... | H04L 63/0815 |
| | | | | 726/3 |
| 2015/0200924 A1* | 7/2015 | Parla | ....................... | H04L 63/04 |
| | | | | 726/7 |
| 2016/0044124 A1 | 2/2016 | Sarukkai et al. | | |
| 2020/0236102 A1 | 7/2020 | Azulay et al. | | |
| 2021/0194871 A1 | 6/2021 | Batchu et al. | | |
| 2021/0336944 A1* | 10/2021 | Brinckman | ........... | H04L 67/306 |
| 2022/0046018 A1 | 2/2022 | Mullender et al. | | |
| 2022/0141278 A1 | 5/2022 | Malik et al. | | |
| 2022/0188438 A1 | 6/2022 | Lewin et al. | | |
| 2022/0245263 A1* | 8/2022 | Pasternak | ........... | H04L 65/1108 |

OTHER PUBLICATIONS

International Preliminary Report on Patentability in International Appln. No. PCT/US2023/027050, mailed on Jan. 23, 2025, 14 pages.

International Search Report and Written Opinion in International Appln. No. PCT/US2023/027050, mailed on Aug. 11, 2023, 15 pages.

Extended European Search Report in European Application No. 23836103.4, mailed on Jul. 30, 2025, 9 pages.

\* cited by examiner

```
"signOn": {
    "defaultRelayState": null,
    "ssoAcsUrlOverride": "https://node-cluster48-
rbi.example.com/ibreports/web/rbi/guestSession/saml",
    "audienceOverride": null,
    "recipientOverride": null,
    "destinationOverride": null,
    "attributeStatements": []
}
```

FIG. 4

COMPUTER SECURITY SYSTEM WITH REMOTE BROWSER ISOLATION USING FORWARD PROXYING

CROSS-REFERENCE TO RELATED APPLICATIONS

This application is a continuation of, and claims the benefit of priority to U.S. application Ser. No. 18/139,192, filed on Apr. 25, 2023, which is a continuation of U.S. application Ser. No. 17/861,107, filed on Jul. 8, 2022 (now U.S. Pat. No. 11,683,305), the contents of which are hereby incorporated by reference.

BACKGROUND

A computer network is a collection of computers and other hardware interconnected by communication channels that allow sharing of resources and information. Communication protocols define the rules and data formats for exchanging information in a computer network.

Distributed computing involves multiple computing devices organized to cooperatively perform a particular application. For example, a computationally expensive task may be split into subtasks to be performed in parallel by the computing devices in the distributed network, allowing the task to be completed faster. Distributing computing may also involve fragmenting a data set and storing it across multiple storage devices. Distributed computing may also involve the multiple computing devices handling individual requests from clients, such as requests for data received over the Internet. Providing computing services over the Internet using such a distributed approach is generally referred to as "cloud computing."

SUMMARY

A network-provided service such as a web app can be made accessible to users of an identity provider, and can be hosted in a remote browser isolation (RBI) environment to protect the security of both the service provider and client devices of users using the service. To accomplish this, the elements can use a permission object (e.g., Security Assertion Markup Language, or SAML, assertion) that contains brokering information to allow the RBI environment to broker permission objects, and host the service in an RBI or other protective environment.

A system of one or more computers can be configured to perform particular operations or actions by virtue of having software, firmware, hardware, or a combination of them installed on the system that in operation causes the system to perform the actions. One or more computer programs can be configured to perform particular operations or actions by virtue of including instructions that, when executed by data processing apparatus, cause the apparatus to perform the actions. One general aspect includes a system for managing access to a network-provided service. This system can include a client device which may include a processor and memory, the client device configured to receive user-input and provide user-output to a client-user. The system also includes a service provider which may include a processor and memory, the service provider configured to serve a network-provided service for authorized users. The system also includes an identity provider that may include a processor and memory, the identity provider configured to: maintain authorization information for the network-provided service and generate a permission-object that i) specifies that the client-user is an authorized user of the network-provided service, and ii) may include an access-override field that specifies a network address of a remote browser isolation (RBI) host. The system also includes the RBI host that may include a processor and memory, the RBI host configured to access the network-provided service; run the network-provided service in an isolation environment to generate a graphic user interface (GUI); provide a visual reproduction of the GUI to the client device; receive browser-input from the client device; and apply the browser-input to the running network-provided service. Other embodiments of this aspect include corresponding computer systems, apparatus, and computer programs recorded on one or more computer storage devices, each configured to perform the actions of the methods.

Implementations may include one or more of the following features. The system where: the client device is further configured to: send, to the identity provider, an access-request to access the network-provided service that is served by the service provider; the identity provider is further configured to: receive, from the client device, the access-request; and send, to the client device, the permission-object; the client device is configured to: receive, from the identity provider, the permission-object; and send, to the RBI host, the permission-object. The client device is configured to: send, to the identity provider, credentials for the client-user; and the identity provider is configured to: verify the identity and permissions of the client-user. The identity provider is configured to, responsive to verifying the identity and permissions of the client-user, send, to the client device, the permission-object. The identity provider is further configure to send, to the client device, a dashboard to be rendered with elements that, when selected by the client-user, cause the client device to send, to the identity provider, the access-request. The client device is configured to: send, to the service provider, an access-request to access the network-provided service that is served by the service provider; the service provider is configured to: receive, from the client device, the access-request; send an authentication request; the identity provider is configured to: receive the authentication request; determine that the client-user is an authorized user of the network-provided service; send, to the client device, the permission-object; the client device is configured to: receive, from the identity provider, the permission-object; and send, to the RBI host, the permission-object. To determine that the client-user is an authorized user of the network-provided service, the identity provider is configured to: send, to the client device, a credential request; receive, from the client device, credentials for the client-user; and verify authentication of the client-user. To determine that the client-user is an authorized user of the network-provided service, the identity provider is configured to determine that the client-user is already authenticated. The permission-object is a security assertion markup language (SAML) object. A schema for the permission-object defines: the access-override field as being free of user-specific characters; and other fields as containing user-specific characters including at least one cryptographic signature. The RBI host is one of a plurality of RBI hosts each configured to run the network-provided service. A schema for the permission-object defines: the access-override field as containing a network address that is may include for a plurality of the authorized. The identity provider is one of a plurality of identity providers each configured to generate permission-objects the network-provided service. The identity provider is configured to send, to the client device, the permission object; and the client device is configured to send the permission-object to the RBI host. The identity provider is configured to send, to the RBI host, the permission object. Implementations of the described techniques may include hardware, a method or process, or computer software on a computer-accessible medium.

One general aspect includes an identity provider that may include a processor and memory, the identity provider configured to receive, from a client device, an access-request to access the network-provided service that is served by a service provider; and send, to the client device, the permission-object. Other embodiments of this aspect include corresponding computer systems, apparatus, and computer programs recorded on one or more computer storage devices, each configured to perform the actions of the methods.

Implementations may include one or more of the following features. The identity provider where the identity provider is configured to: receive, from a client device, an access-request to access the network-provided service that is served by a service provider; and send, to the client device, the permission-object. The identity provider is configured to, responsive to verifying the identity and permissions of the client-user, send, to the client device, the permission-object. The identity provider is further configure to send, to the client device, a dashboard to be rendered with elements that, when selected by the client-user, cause the client device to send, to the identity provider, the access-request. Implementations of the described techniques may include hardware, a method or process, or computer software on a computer-accessible medium.

One general aspect includes a remote browser isolation (RBI) host that may include a processor and memory configured to receive a permission-object that i) specifies that a client-user is an authorized user of a network-provided service; and ii) comprises an access-override field that specifies a network address of the RBI host; and instantiate an RBI instance configured to: access the network-provided service; run the network-provided service in an isolation environment to generate a graphic user interface (GUI); provide a visual reproduction of the GUI to a client device of the client-user; receive browser-input from the client device; and apply the browser-input to the running network-provided service. Other embodiments of this aspect include corresponding computer systems, apparatus, and computer programs recorded on one or more computer storage devices, each configured to perform the actions of the methods.

Implementations can provide some, all, or none of the following advantages. An RBI environment can host a network-provided service by brokering a SAML or similar permission object. This kind of forward proxy arrangement can be accomplished with minimal maintenance overhead compared to more complicated reverse proxy arrangements. For example, instead of needing to develop service-specific proxy settings to rewrite addresses in a webpage addressed to a client device, an RBI session can be created in which a reverse proxy is the addressed recipient of the service from the service provider. This allows for less chance of proxy escape, which advantageously increases security. Similarly, this can allow the RBI environment to host any service served from an address and runnable in a web browser, instead of being limited to only the small number of pre-arranged services that a reverse proxy is able to handle with per-service settings.

Although many other RBI implementations support SAML for authentication, end-users will authenticate to the RBI service provider and then must typically re-authenticate with the cloud application they wish to log into that also requires SAML. With this technology, a single SAML (or similar) login is used to log the user into both the RBI session and the destination cloud application, eliminating multiple redundant logins.

This technology also uses the original SAML assertion that would normally be presented to the destination cloud application had RBI not been used without re-signing or modifying the SAML assertion that is presented by the Identity Provider (IdP). The RBI session automatically brokers the original, unmodified SAML assertion object to the destination cloud application after the user is connected to the cloud application through the isolated RBI session. This reduces risk and preserves the original integrity of the original end-user authentication flow.

The RBI implementation is able to transparently place a user into an isolated RBI session, with single sign-on (SSO) into the destination cloud application with a simple change to single redirect URL within the Identity Provider. The Assertion Consumer Service (ACS) URL is modified to be that of the RBI provider instead of the cloud application which causes the IdP to send the assertion after authentication to the RBI session instead of to the cloud application directly. The RBI session brokers the original unmodified SAML assertion object to the destination cloud application. The original SAML assertion object may contain the original ACS redirect URL which allows the RBI session to automatically determine the intended cloud application login destination URL which is used to place the user into the cloud application. This eliminates the need for additional complex configuration which might require an administrator to configure which destination cloud application is being isolated by the RBI service.

Other features, aspects and potential advantages will be apparent from the accompanying description and figures.

DESCRIPTION OF DRAWINGS

FIG. 4 is a schematic diagram of an example permission object.

Like reference symbols in the various drawings indicate like elements.

DETAILED DESCRIPTION

A web-based resource can be provided to users in an RBI host if the user is authorized according to an identity provider. An identity provider can send an HTTP redirect in response to login that contains a URL of an RBI service. The identity provider can provide an assertion to the machine of the user specifying their permission, and this assertion can contain an original URL of a cloud application. Then the client device can redirect to the address of an RBI host and provide the assertion to the RBI host.

The RBI host can then launch a remote browser and read the originally intended application login URL from the assertion object and inject that URL into the remote browser with the assertion inside of it, logging in the user. The end user then sees an image of the remote browsing session through the RBI service in a graphic user interface (GUI) of the service to the client device and receiving GUI input from the client device to be applied to the network service.

Figure 1:
FIG. 1 is a block diagram of an example system that can be used for managing access to a network-provided service.

FIG. 1 is a block diagram of an example system 100 that can be used for managing access to a network-provided service. In the system 100, a client device 102 is, for example, a desktop computer or mobile phone used by a user (i.e. a human that it using the client device 102) that receives user-input and provide user-output to a user. This user can have an identity that is managed by an identity provider 104. For example, an organization such as a business or school may use the identity provider 104 to maintain authorization information for the network provided service. In other examples, the user is not associated with any organization for the identity provider 104 and instead uses the identity provider 104 to enable single sign on (SSO) to various different service providers without the need to manage different credentials for each of the service providers, with the identity provider 104 maintaining authorization information for the network provided service.

A service provider 106 provides one or more services for authorized users, in some cases referred to as cloud service or cloud apps. For example, the service provider 106 can provide browser-based services for email, cloud storage of data, image or video editing, document creation, etc. To manage the authorization of users to use the service(s) provided by the service provider 106, the service provider 106 can work with the identity provider 104. For some or all users of the service(s) of the service provider 106, this authentication and authorization functionality can be off-loaded to the identity provider 104, and possibly other identity providers (not shown).

An RBI host 108 can instantiate RBI sessions for network services. RBI sessions can include controlled execution or running of network services. These RBI sessions can (but do not need to) include security services that can protect user devices and/or service providers when a user is using the network service. For example, the client device 102 may never locally store any data from the service provider 106, allowing the user to access secure information without risk to the service provider 106 that the data will be exfiltrated by a compromised client device 102. Similarly, the client device 102 can be protected from malicious services because the network service need never run on the client device 102. The BRI session can include sandboxing operations that monitor activity within the RBI and prevent unapproved (e.g., data exfiltration) or unsecure (e.g., remote code execution) operations.

In some examples, to provide the user with the network-provided service, the client device 102 can request 110 the service or authorization for the service from the identity provider. In some other examples, the client device 102 can send a request 112 to the service provider 106 and be redirected to the identity provider 104.

The identity provider 104 can verify that the user of the user device 102 is authenticated (e.g., is the person they assert to be) and is authorized to use the network-provided service (e.g., permitted). The identity provider 104 can provide to the client device 102 an assertion data object that includes information recording the identity provider's 104 determination that the user of the user device 102 is authenticated and authorized, and also contains information to allow a web browser of the client device 102 to redirect to the network location of the RBI host 108. The RBI host 108 can then broker the assertion and instantiate 114 an RBI instance to hose the network-provided service.

Each of the elements 102-108 described here can be implemented in appropriate computing hardware. For each, they may be a single device or multiple devices working together. The elements 102-108 can each include one or more hardware elements such as processors, memory, etc. The elements 102-108 can communicate through one or more data networks. These networks can include the internet and can also or alternatively include local networks. That is to say, the elements 102-108 may be remote from each other and communicate through the internet, may all be hosted by the same organization on the same local or virtual private network, or a mix (e.g. with the identity provider 104 and service provider 106 on an organization's network, and the client device 102 and the RBI host 108 being remote from the organization's network).

Figure 2:
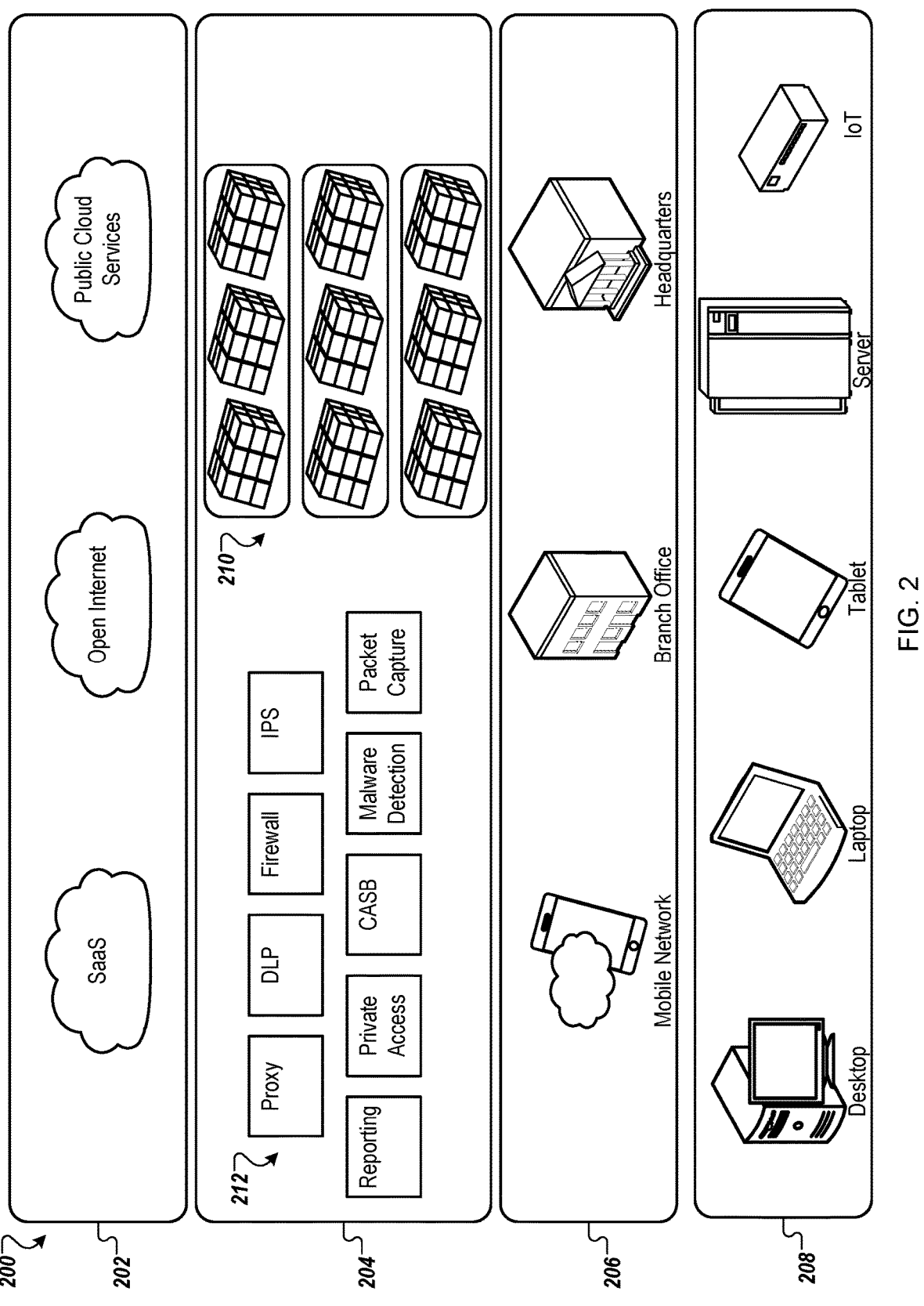
FIG. 2 is a schematic diagram of example network architecture that can be used for managing access to a network-provided service.

FIG. 2 is a schematic diagram of example network architecture 200 that can be used for managing access to a network-provided service. In the architecture 200, a device layer 208 contains user devices such as desktops, laptops, tablets, servers, and Internet of Things (IoT) devices that may operate as the client devices 102. An access network layer 206 contains access networks by which the devices of the layer 208 access network resources, including mobile networks and intranet networks at various physical locations. A security layer 204 contains hardware 210 running security services 212, including one or more RBI hosts 108. A service layer contains hardware running services, including service provider 106 and identity provider 104. Examples of the services 212 of the security layer include, but are not limited to, proxy services, data loss prevention, firewall services, intrusion prevention services, reporting services, private access to data, cloud access security brokering, malware detection, and packet capture. The hardware 210 can be collections of nodes (e.g., virtual machines, hosted applications, physical servers). In the example shown, three different network service providers are used, each supplying three datacenters with virtual machines, hosted applications, and physical services. However, other arrangements are possible.

Figure 3A:
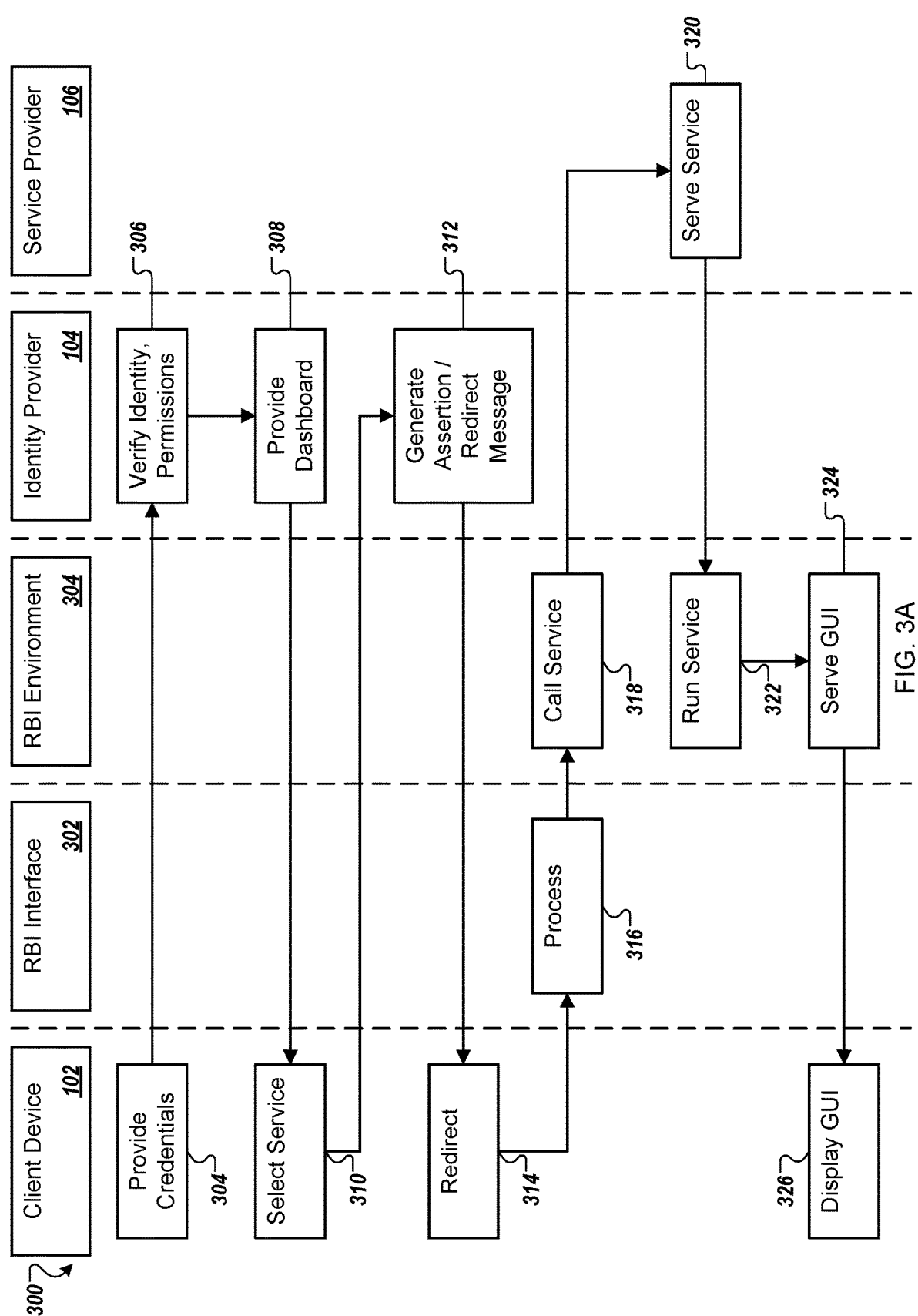
FIGS. 3A-3C are swimlane diagrams of example processes that can be used for managing access to a network-provided service.

FIG. 3A is a swimlane diagrams of an example process 300 that can be used for managing access to a network-provided service. The process 300 can be performed by, for example, the system 100 and as such will be described with reference to elements of the system 100. However, another system or systems can be used to perform the process 300 or a similar process. The RBI host 108 can include an RBI interface 302 to handle communication tasks and an RBI environment 304 for instantiating RBI instances and hosting network provided services.

The client device 102 sends 304, to the identity provider 104, credentials for the client-user. For example, the user of the client device 102 can open a web browser and navigate to the web address of the identity provider's 104 webpage and can log in to with a username, password, 2-factor code, etc.

The identity provider 104 verifies 306 the identity and permissions of the client-user. For example, the identity provider 104 may send a request for the user's credentials, may determine that the client device 102 is storing a cookie signed by the identity provider 104, may determine that the client device 102 is on a virtual private network with permissions to access the network-provided service, etc.

The identity provider 104 sends 308, to the client device 102, a dashboard to be rendered with elements that, when selected by the client-user, cause the client device to send, to the identity provider, the access-request. For example, the dashboard may be part of a webpage that, when rendered, shows icons for various network-provided services that the user is authorized to access.

The client device 102 sends 102 send 310, to the identity provider, an access-request to access the network-provided service that is served by the service provider. For example, the client may click, using a mouse or touchpad, the rendered icon of a network-provided service and the browser may send a message to the identity provider 104 requesting the selected network-provided service.

The identity provider 104 receives, from the client device, the access-request and generates 312 a permission-object that i) specifies that the client-user is an authorized user of the network-provided service; and ii) comprises an access-override field that specifies a network address of the RBI frontend 302. The identity provider 104 can send, to the client device 102, the permission-object and a redirect message with the URL of the RBI interface 302. For example, the identity provider 104 may look up in memory data needed to complete a permission-object from a template. Such information can include the network address of the RBI interface 302. The identity provider may add that network address to the permission-object in the access-override field.

In an alternative example, instead of providing a dashboard 308, the service provider 106 can respond to the verification 306 by sending 312, to the client device 102, the permission-object. For example, this may be a desirable implementation when the identity provider is managing identities for only a single network-provided service.

The client device 102 can redirect 314 from the identity provider 104 to the RBI interface 302 by receiving, from the identity provider 104, the permission-object and redirect message; and sending, to the RBI interface 302, the permission-object. For example, the browser of the client device 102 may, transparently to the user, redirect from the identity provider 104 to the RBI interface 302.

The RBI interface 302 receives the permission object to process 316 it. For example, the browser may send, as part of the redirect, the permission object to the RBI interface.

The RBI environment 304 can instantiate an RBI instance and access 318 the network-provided service. For example, the RBI environment may look up in memory a web address of the service provider 106 and request the network-provided service from the web address. The service provider 106 can serve 320 the network-provided resource to the RBI environment 304.

The RBI environment 304 runs 322 the network-provided service in an isolation environment to generate a graphic user interface (GUI). For example, the RBI environment may run a web browser in a sandbox environment with heightened security settings compared to default web browser. This execution can generate a GUI that may normally be displayed locally when not run in a sandbox environment.

The RBI environment 304 provides 324 a visual reproduction of the GUI to the client device 102. For example, the BRI environment 304 (or RBI interface 302, etc.) can generate a plurality of tiles from the GUI, and serve each tile as an image file to the client device.

The client device 102 displays 326 the GUI to the user and receives input from the user. For example, the client device 102 can reassemble the tiles to be displayed by the web browser to the user of the client device 102. In response, the user can click an button, drag a scroll bar, or otherwise interact with interface elements shown in the display of the GUI.

The RBI environment receives browser-input from the client device 102 applies the browser-input to the running network-provided service. For example, the client device 102 can send an instruction to the RBI interface 302 that records, for example, the location and type of interaction that the user imitated. The RBI environment can translate this message into a command to the sandbox environment that simulates the user input, and can run the network-provided service with this input. Then, as the GUI is updated, the RBI environment 302 and client device 102 can continue elements 322, 324, and 326 as the user continues to interact with the displayed GUI and the service continues to run.

Figure 3B:
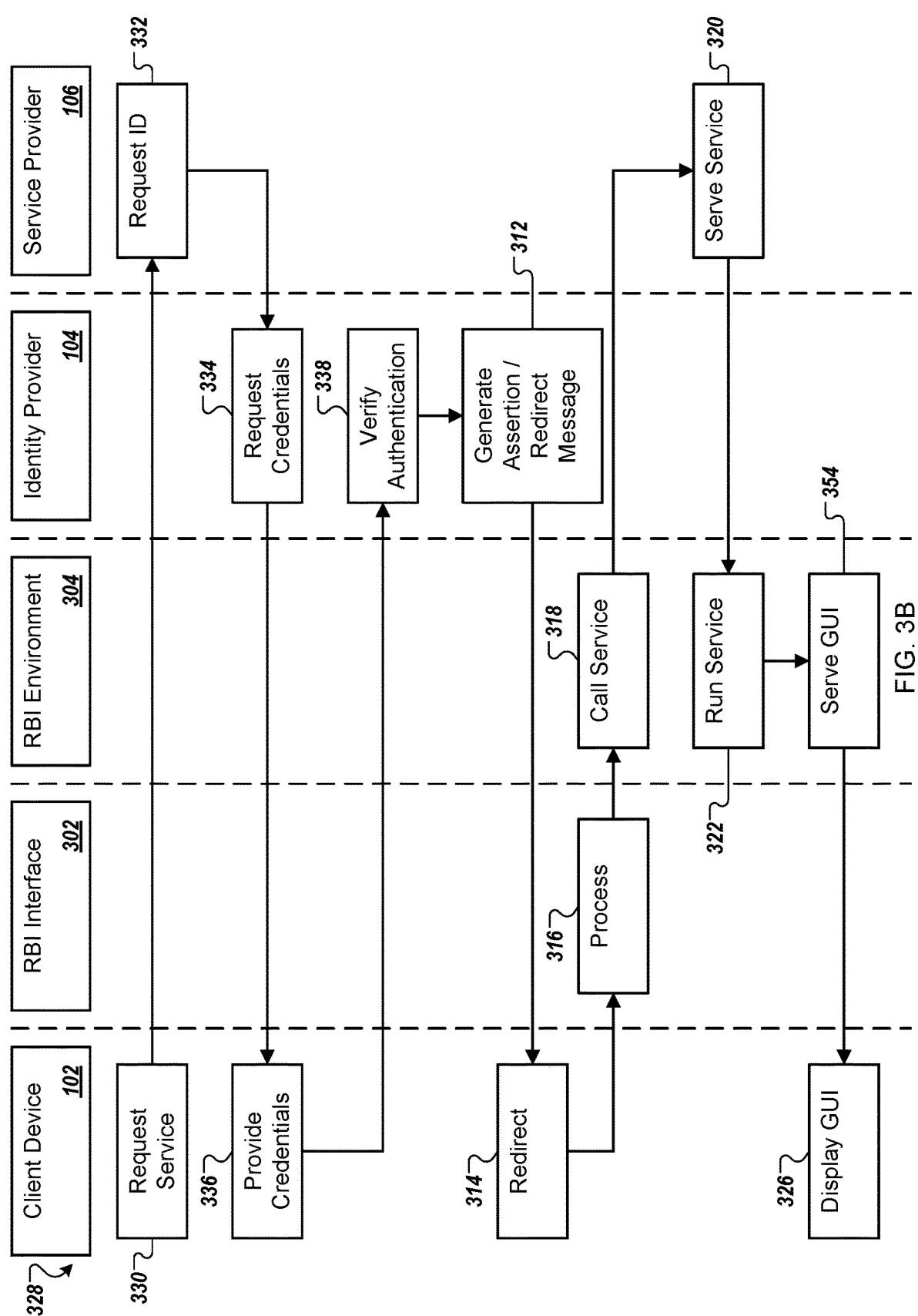

FIG. 3B is a swimlane diagrams of an example process 328 that can be used for managing access to a network-provided service. The process 328 can be performed by, for example, the system 100 and as such will be described with reference to elements of the system 100. However, another system or systems can be used to perform the process 328 or a similar process. The RBI host 108 can include an RBI interface 302 to handle communication tasks and an RBI environment 304 for instantiating RBI instances and hosting network provided services.

The client device 102 sends 330, to the service provider 106, an access-request to access the network-provided service that is served by the service provider. The service provider 106 receives, from the client device 102, the access-request. For example, the user of the client device 102 can open a web browser and navigate to the web address of the service provider 106 and request the network-provided service.

The service provider 106 sends 332, an authentication-request. For example, instead of serving the network-provided service to the client device 102, the service provider 106 can redirect the client device's 102 browser to the identity provider.

The identity provider 104 receives the authentication request and determines that the client-user is an authorized user of the network-provided service. To determine that the client-user is an authorized user of the network-provided service, the identity provider 104 sends 334, to the client device 336, a credential request, receive, from the client device 102, credentials for the client-user; and verifies 338 authentication of the client-user. The client device 102 provides the credentials. For example, the identity provider 104 may serve a log-in webpage and receive the user's username, password, 2-factor code, etc.

The process 328 can then continue 312-326.

Figure 3C:
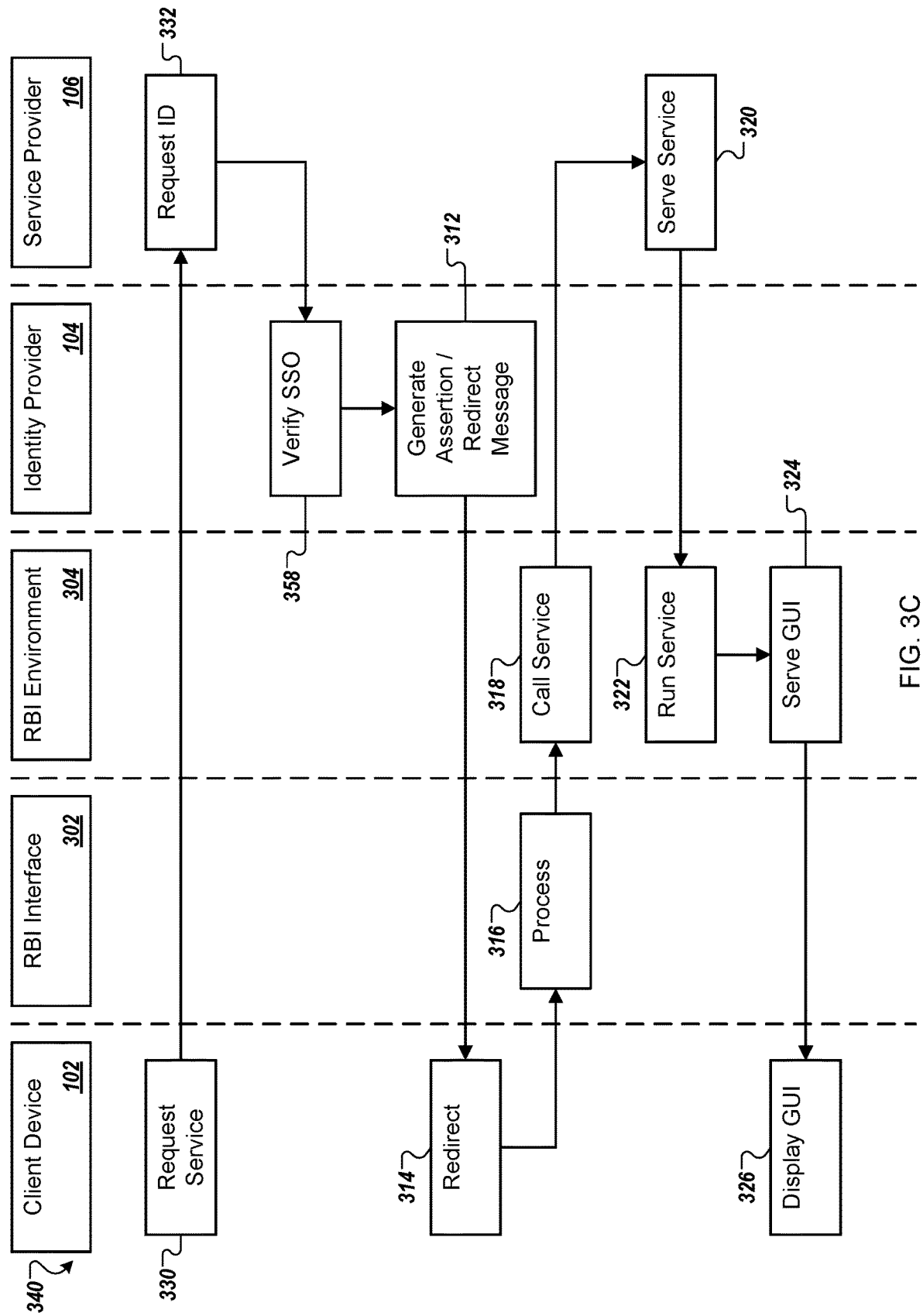

FIG. 3C is a swimlane diagrams of an example process 340 that can be used for managing access to a network-provided service. The process 340 can be performed by, for example, the system 100 and as such will be described with reference to elements of the system 100. However, another system or systems can be used to perform the process 340 or a similar process. The RBI host 108 can include an RBI interface 302 to handle communication tasks and an RBI environment 304 for instantiating RBI instances and hosting network provided services.

In the process 340, to determine that the client-user is an authorized user of the network-provided service, the identity provider 106 determine 342 that the client-user is already authenticated. For example, the web browser of the client device 102 can store a cookie that was previously serviced by the identity provider 104. This cookie can store a cryptographically signature or secret data that the identity provider 104 can read and recognize as being issued from a previous single-sign-on event.

FIG. 4 is a schematic diagram of a code snippet 400 of an example permission object. In this example, the permission object is a Security Assertion Markup Language (SAML) object, though other examples can include Extensible Markup Language (XML) data objects, OAuth tokens, etc.

The permission object can conform to a scheme published and accessible by the identity provider 104, service provider 106, RBI host 108, etc. This schema can define the data fields of the permission object. One such data field defined in the scheme is an access-override field 402. This access-override field 402 can be created to store the network address at which the RBI host 108 can request the network-provided service from the service provider 106. In some cases, this network address is unique to the user of the client device 102, the organization of the user, etc. In some cases, this network address is common to all users and consistent for a plurality of the authorized users. That is to say, all users authenticated by the identity provider 104 would get the same address in their permission object in such a scheme. As can be seen, the access-override field 402 can be (but does not need to be) free of user-specific characters such as a hash of the user's identity, a cryptographic signature, etc. However, other fields in the permission object may contain such user-specific characters.

Figure 5:
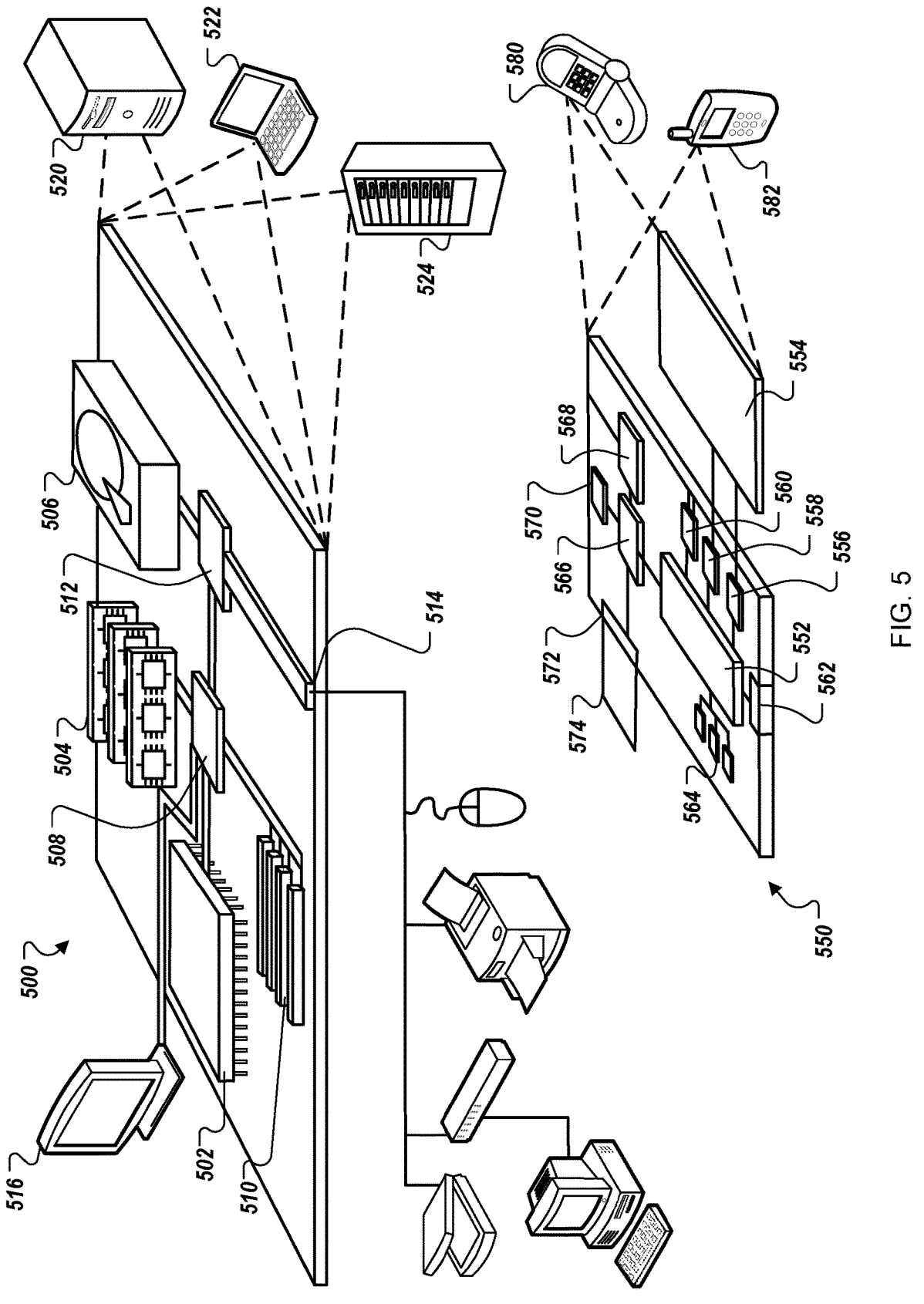
FIG. 5 is a schematic diagram that shows an example of a computing device and a mobile computing device.

FIG. 5 shows an example of a computing device 500 and an example of a mobile computing device that can be used to implement the techniques described here. The computing device 500 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and can be mounted on a common motherboard or in other manners as appropriate. The processor 502 can process instructions for execution within the computing device 500, including instructions stored in the memory 504 or on the storage device 506 to display graphical information for a GUI on an external input/output device, such as a display 516 coupled to the high-speed interface 508. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 can also be another form of computer-readable medium, such as a magnetic or optical disk.

The storage device 506 is capable of providing mass storage for the computing device 500. In some implementations, the storage device 506 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 504, the storage device 506, or memory on the processor 502.

The high-speed interface 508 manages bandwidth-intensive operations for the computing device 500, while the low-speed interface 512 manages lower bandwidth-intensive operations. Such allocation of functions is exemplary only. In some implementations, the high-speed interface 508 is coupled to the memory 504, the display 516 (e.g., through a graphics processor or accelerator), and to the high-speed expansion ports 510, which can accept various expansion cards (not shown). In the implementation, the low-speed interface 512 is coupled to the storage device 506 and the low-speed expansion port 514. The low-speed expansion port 514, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 500 can be implemented in a number of different forms, as shown in the figure. For example, it can be implemented as a standard server 520, or multiple times in a group of such servers. In addition, it can be implemented in a personal computer such as a laptop computer 522. It can also be implemented as part of a rack server system 524. Alternatively, components from the computing device 500 can be combined with other components in a mobile device (not shown), such as a mobile computing device 550. Each of such devices can contain one or more of the computing device 500 and the mobile computing device 550, and an entire system can be made up of multiple computing devices communicating with each other.

The mobile computing device 550 includes a processor 552, a memory 564, an input/output device such as a display 554, a communication interface 566, and a transceiver 568, among other components. The mobile computing device 550 can also be provided with a storage device, such as a micro-drive or other device, to provide additional storage. Each of the processor 552, the memory 564, the display 554, the communication interface 566, and the transceiver 568, are interconnected using various buses, and several of the components can be mounted on a common motherboard or in other manners as appropriate.

The processor 552 can execute instructions within the mobile computing device 550, including instructions stored in the memory 564. The processor 552 can be implemented as a chipset of chips that include separate and multiple analog and digital processors. The processor 552 can provide, for example, for coordination of the other components of the mobile computing device 550, such as control of user interfaces, applications run by the mobile computing device 550, and wireless communication by the mobile computing device 550.

The processor 552 can communicate with a user through a control interface 558 and a display interface 556 coupled to the display 554. The display 554 can be, for example, a TFT (Thin-Film-Transistor Liquid Crystal Display) display or an OLED (Organic Light Emitting Diode) display, or other appropriate display technology. The display interface 556 can comprise appropriate circuitry for driving the display 554 to present graphical and other information to a user. The control interface 558 can receive commands from a user and convert them for submission to the processor 552. In addition, an external interface 562 can provide communication with the processor 552, so as to enable near area communication of the mobile computing device 550 with other devices. The external interface 562 can provide, for example, for wired communication in some implementations, or for wireless communication in other implementations, and multiple interfaces can also be used.

The memory 564 stores information within the mobile computing device 550. The memory 564 can be implemented as one or more of a computer-readable medium or media, a volatile memory unit or units, or a non-volatile memory unit or units. An expansion memory 574 can also be provided and connected to the mobile computing device 550 through an expansion interface 572, which can include, for example, a SIMM (Single In Line Memory Module) card interface. The expansion memory 574 can provide extra storage space for the mobile computing device 550, or can also store applications or other information for the mobile computing device 550. Specifically, the expansion memory 574 can include instructions to carry out or supplement the processes described above, and can include secure information also. Thus, for example, the expansion memory 574 can be provide as a security module for the mobile computing device 550, and can be programmed with instructions that permit secure use of the mobile computing device 550. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 564, the expansion memory 574, or memory on the processor 552. In some implementations, the computer program product can be received in a propagated signal, for example, over the transceiver 568 or the external interface 562.

The mobile computing device 550 can communicate wirelessly through the communication interface 566, which can include digital signal processing circuitry where necessary. The communication interface 566 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 568 using a radio-frequency. In addition, short-range communication can occur, such as using a Bluetooth, WiFi, or other such transceiver (not shown). In addition, a GPS (Global Positioning System) receiver module 570 can provide additional navigation- and location-related wireless data to the mobile computing device 550, which can be used as appropriate by applications running on the mobile computing device 550.

The mobile computing device 550 can also communicate audibly using an audio codec 560, which can receive spoken information from a user and convert it to usable digital information. The audio codec 560 can likewise generate audible sound for a user, such as through a speaker, e.g., in a handset of the mobile computing device 550. Such sound can include sound from voice telephone calls, can include recorded sound (e.g., voice messages, music files, etc.) and can also include sound generated by applications operating on the mobile computing device 550.

The mobile computing device 550 can be implemented in a number of different forms, as shown in the figure. For example, it can be implemented as a cellular telephone 580. It can also be implemented as part of a smart-phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer system comprising:
an identity provider comprising a processor and memory, the identity provider configured to:
verify authentication of a client device for a client-user as an authorized user of a network-provided service;
generate a permission-object that specifies that the client-user is an authorized-users of the network-provided service, the permission-object comprising, at the time of creation, an access-override field that specifies a network address of a remote browser isolation (RBI) host;
transmit, over a computer network, a redirect message to the client-user, the redirect message comprising i) the permission-object and ii) redirect instructions that, when executed by the client device, causes the client device to request that the network-provided service is loaded into a remote security environment using the permission-object.

2. The computer system of claim 1, wherein the identity provider is configured to maintain authorization information for the network-provided service.

3. The computer system of claim 2, wherein to verify authenticity of the client device, the identity provider is further configured to:
send, to the client device, a credential request;
receive, from the client device, credentials for the client-user; and
verify authentication of the client-user.

4. The computer system of claim 1, wherein the permission-object is a Security Assertion Markup Language (SAML) object.

5. The computer system of claim 1, wherein a schema for the permission-object further defines:
the access-override field as containing the network address as consistent for a plurality of the authorized user.

6. An identity provider comprising a processor and memory, the identity provider configured to:
verify authentication of a client device for a client-user as an authorized user of a network-provided service;
generate a permission-object that specifies that the client-user is an authorized-users of the network-provided service, the permission-object comprising, at the time of creation, an access-override field that specifies a network address of a remote browser isolation (RBI) host;
transmit, over a computer network, a redirect message to the client-user, the redirect message comprising i) the permission-object and ii) redirect instructions that, when executed by the client device, cause the client device to request that the network-provided service is loaded into a remote security environment using the permission-object.

7. The identity provider of claim 6, wherein the identity provider is configured to maintain authorization information for the network-provided service.

8. The identity provider of claim 7, wherein the identity provider is further configured to:
send, to the client device, a credential request;
receive, from the client device, credentials for the client-user; and
verify authentication of the client-user.

9. The identity provider of claim 6, wherein the permission-object is a Security Assertion Markup Language (SAML) object.

10. A computer system comprising:
an identity provider comprising a processor and memory, the identity provider configured to:
verify authentication of a client device for a client-user as an authorized user of a network-provided service;
generate a permission-object that specifies that the client-user is an authorized-users of the network-provided service, the permission-object comprising, at the time of creation, an access-override field that specifies a network address of a remote browser isolation (RBI) host;
communicate, over a computer network, a redirect message to the client-user, the redirect message comprising i) the permission-object and ii) redirect instructions that, when executed by the client device, causes the client device to request that the network-provided service is loaded into a remote security environment using the permission-object;
wherein a schema for the permission-object defines:
the access-override field as being free of user-specific characters; and
other fields as containing user-specific characters including at least one cryptographic signature.

11. The computer system of claim 10, wherein the computer system is further configured to:
send, to a client device, a credential request;
receive, from the client device, credentials for the client-user; and
verify authentication of the client-user.

12. The computer system of claim 10, wherein the permission-object is a Security Assertion Markup Language (SAML) object.

13. The computer system of claim 10, wherein the computer system is further configured to:
send, to a client device, a credential request;
receive, from the client device, credentials for the client-user; and
verify authentication of the client-user.

14. The computer system of claim 10, wherein the computer system is configured to:
send, to a client device, the permission-object; and
the client device is configured to send the permission-object to an RBI host.

* * * * *